Jan. 25, 1944. A. L. GRISÉ 2,340,218
LIQUID DISPENSING APPARATUS
Filed April 24, 1943 5 Sheets-Sheet 2
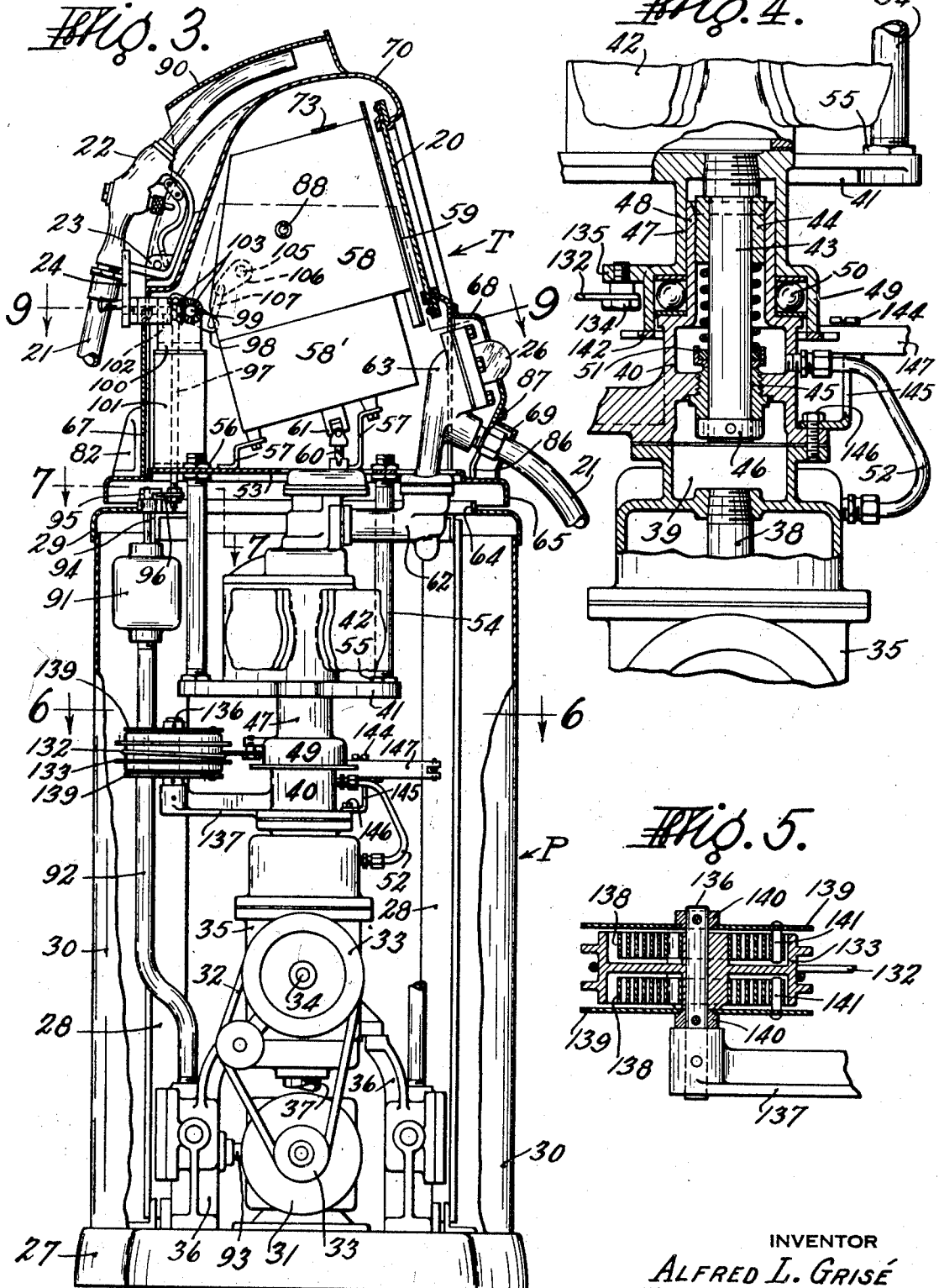
INVENTOR
ALFRED L. GRISÉ
BY
Chapin & Neal
ATTORNEYS Jan. 25, 1944.                A. L. GRISÉ                2,340,218
                       LIQUID DISPENSING APPARATUS
                         Filed April 24, 1943          5 Sheets-Sheet 3
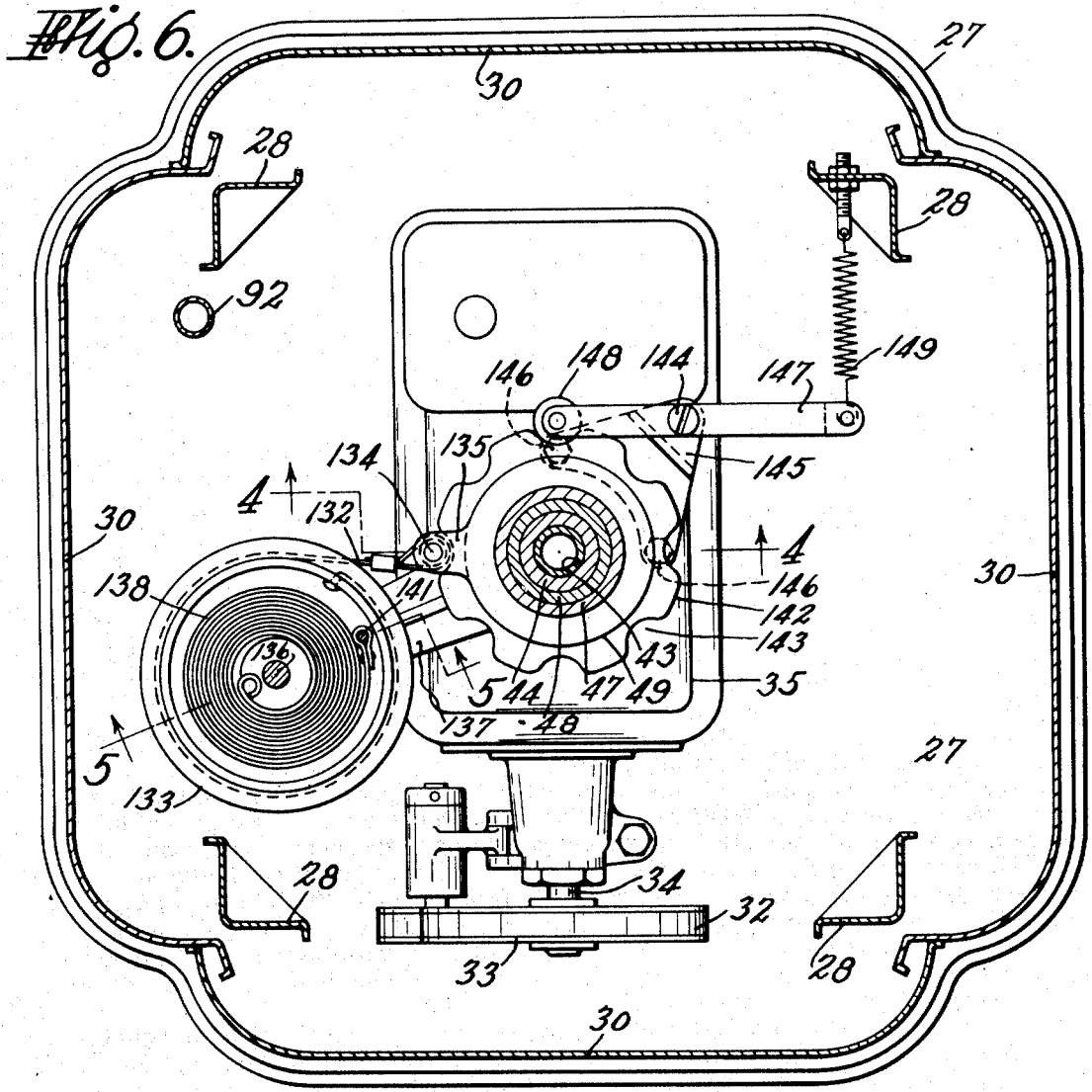
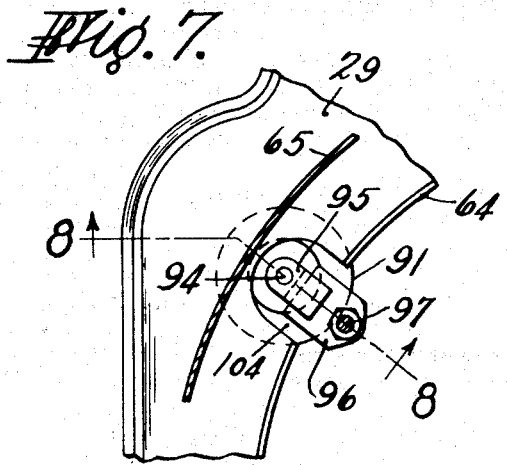
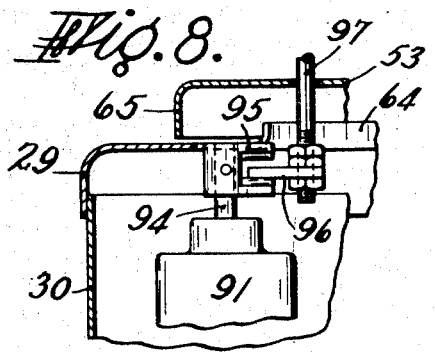
INVENTOR
ALFRED L. GRISÉ
BY Chapin + Neal
ATTORNEYS

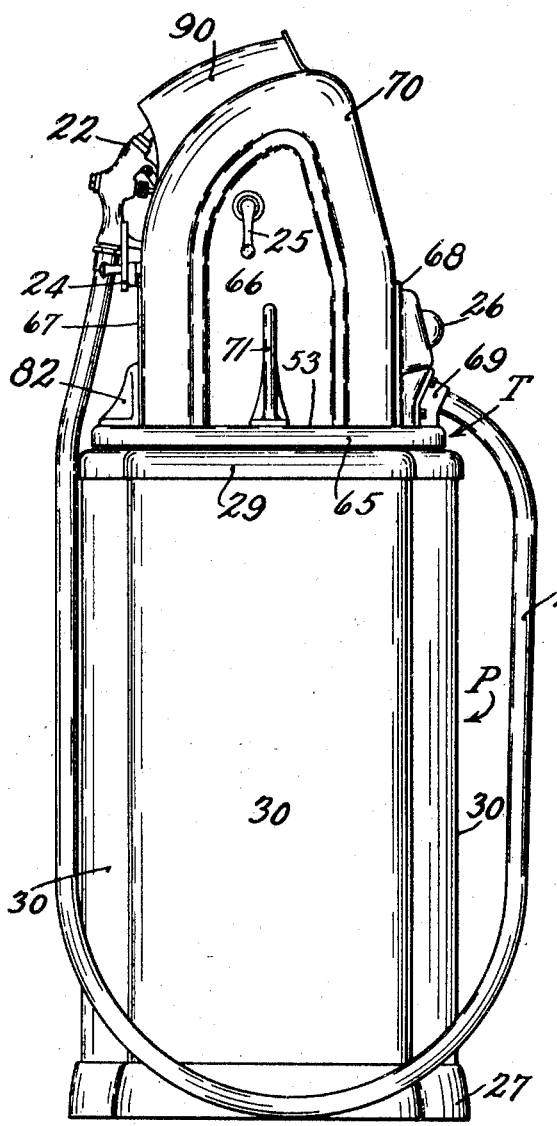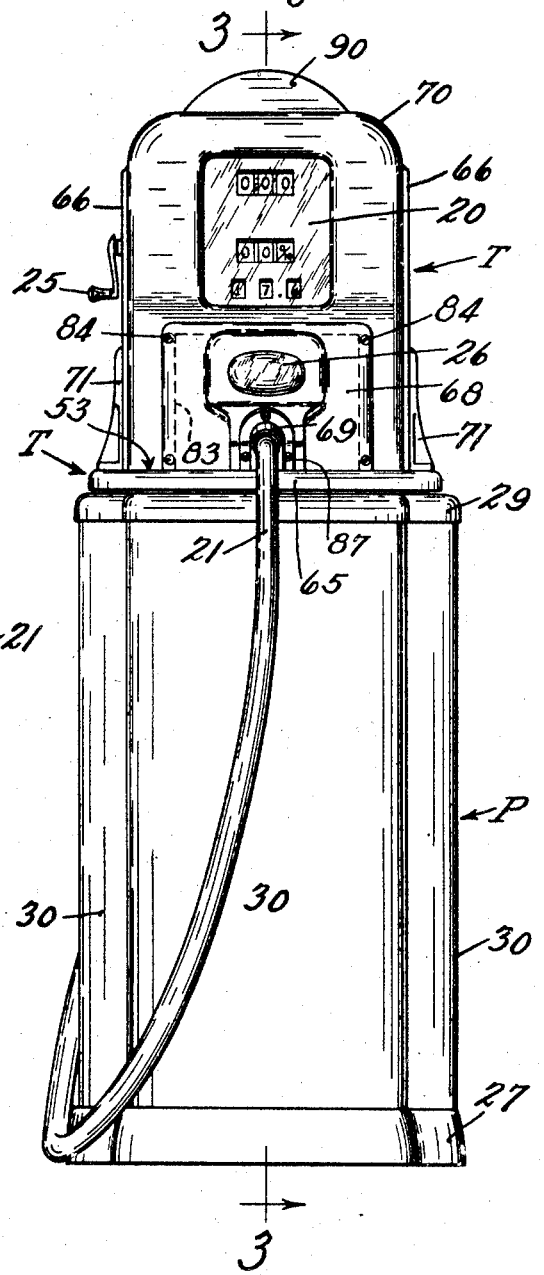

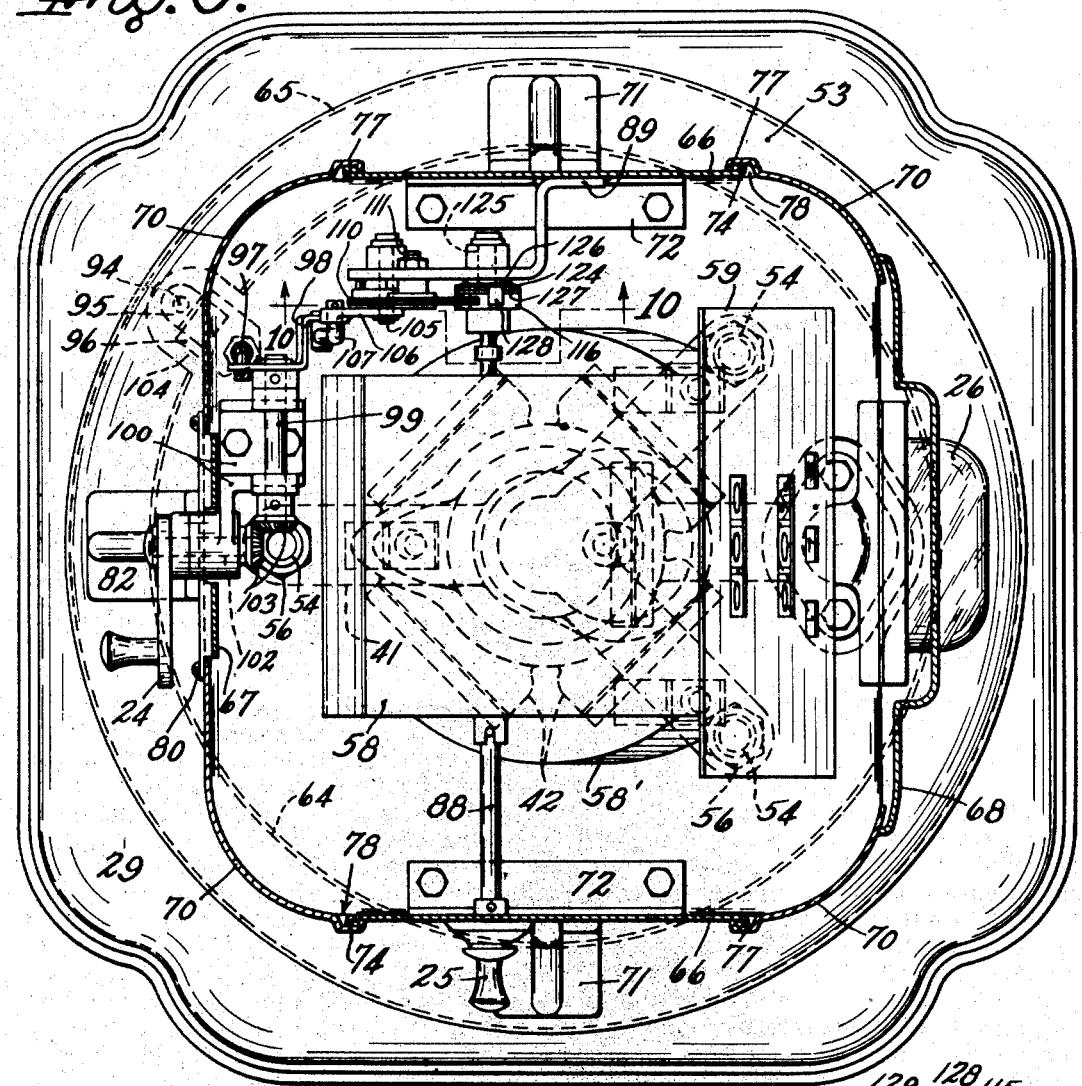

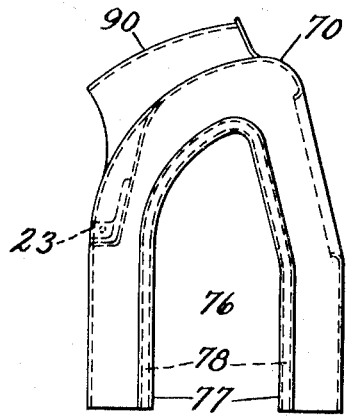
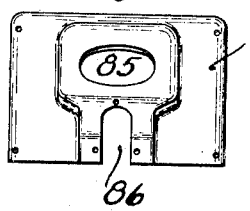
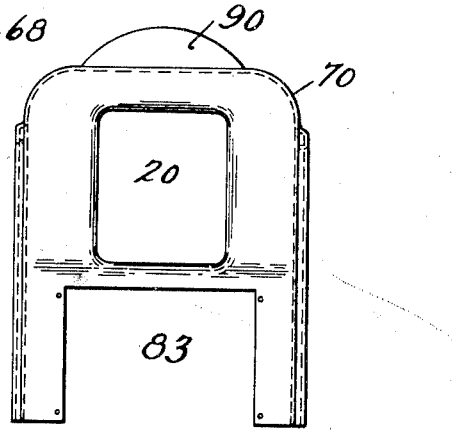
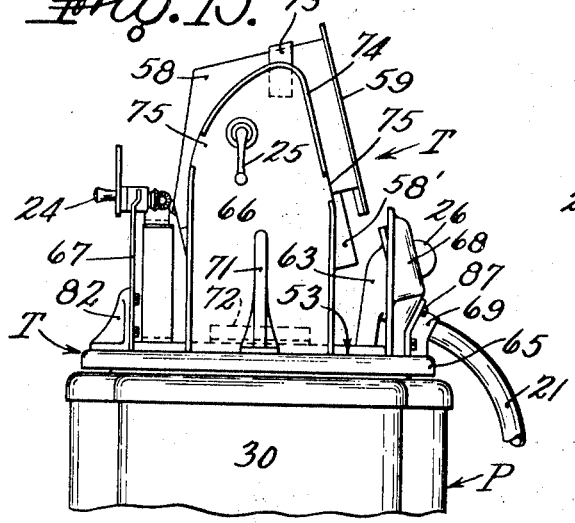
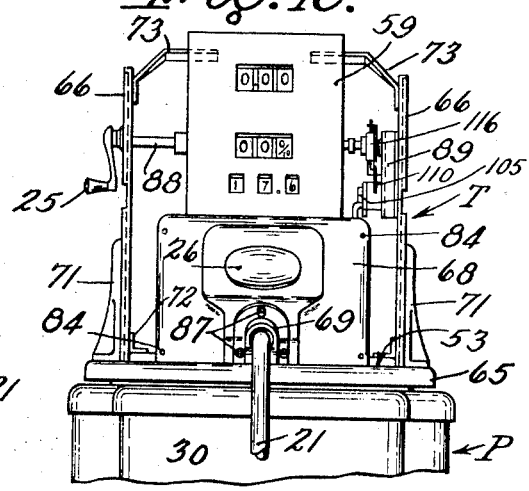
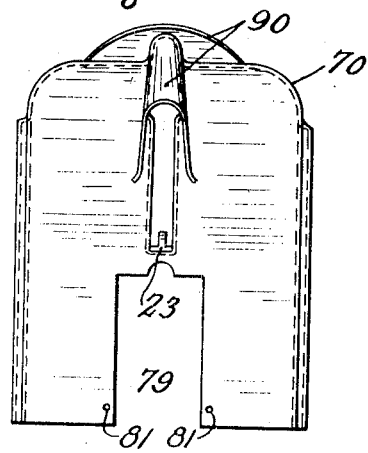
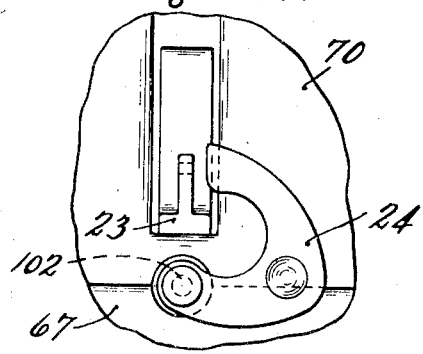

Patented Jan. 25, 1944

2,340,218

UNITED STATES PATENT OFFICE 2,340,218

LIQUID DISPENSING APPARATUS

Alfred L. Grisé, Springfield, Mass., assignor to Gilbert & Barker Manufacturing Company, West Springfield, Mass., a corporation of Massachusetts Application April 24, 1943, Serial No. 484,384

16 Claims. (Cl. 221—95)

This invention relates to an improved apparatus for dispensing measured quantities of liquid, such for example, as is used in the sale of gasoline at service stations.

More particularly, the invention has to do with an apparatus of the class described having a turret which carries the register showing the quantity and/or cost of the liquid dispensed and which is rotatable by pulling on the dispensing hose to any desired radial position for convenient reading of the register. One example of such an apparatus is disclosed in my copending application Serial No. 458,829, filed September 18, 1942, and the present invention in some of its aspects is an improvement on that disclosed in such application.

The invention has for one of its objects to provide in an apparatus of the class described, a means by which the turret may readily be held at the will of the operator in any of a plurality of predetermined radial positions, to which the operator may move it, without requiring him to maintain a pull on the hose for the purpose.

The invention has for another object to provide in an apparatus of the class described, wherein there are means tending to hold the turret in a certain initial or rest position and tending also to return the turret to such position after having been moved out of such position, whenever the pull on the hose is relaxed, a detent means which is capable of holding the turret in any of a number of predetermined radial positions, provided that the turret is moved slowly into any such position, and which is incapable of holding the turret when it is moved rapidly toward any such position, whereby the turret-retaining means and the turret-returning means may be selectively rendered effective at the will of the operator by manipulation of the hose.

Another object of the invention is to provide in apparatus of the class described an improved construction and mounting of the turret.

A further object of the invention is to provide in an apparatus having a rotatable turret carrying the register, an improved casing for housing in the register and having an upper hood section conveniently removable from the base plate section, which supports the register to allow convenient access to the base plate, the register and all other parts supported thereon.

The invention has for a further object to provide a turret having a base plate supporting a computing-type register and the variator mechanism therefor, and a hood section supported on the base plate and enclosing the register and variator—said hood having an independently removable section to allow access to the variator.

These and other objects will best be understood as the detailed description proceeds and they will be pointed out in the appended claims.

The invention will be disclosed with reference to the accompanying drawings, in which:

Figs. 1 and 2 are small scale, exterior, side and front elevational views, respectively, taken at right angles to one another and showing a measuring and dispensing pump embodying the invention;

Fig. 3 is a sectional view, drawn to a larger scale and taken substantially on the line 3—3 of Fig. 2;

Figs. 4 and 5 are fragmentary sectional views, drawn to a still larger scale and taken respectively on the lines 4—4 and 5—5 of Fig. 6;

Fig. 6 is a sectional plan view taken on the line 6—6 of Fig. 3;

Fig. 7 is a fragmentary sectional plan view taken on the line 7—7 of Fig. 3;

Fig. 8 is a sectional elevational view taken on the line 8—8 of Fig. 7;

Fig. 9 is a sectional plan view taken substantially on the line 9—9 of Fig. 3;

Fig. 10 is a fragmentary sectional view, taken on the line 10—10 of Fig. 9 and illustrating the interlock between the switch-actuating means and the register-resetting means;

Fig. 11 is a view taken similarly to Fig. 10 and showing the parts in different relative positions;

Figs. 12, 13 and 14 are side, front, and rear elevational views, respectively, of the removable hood element of the turret of the apparatus;

Figs. 15 and 16 are fragmentary side and front elevational views, respectively, showing the turret of the apparatus as it appears when the hood is removed;

Fig. 17 is a fragmentary rear elevational view taken from the left hand end of Fig. 9 and showing the switch-actuating crank and the related hose nozzle support; and Fig. 18 is a detail view of one of the removable sections on the turret housing.

Referring to these drawings: the apparatus (Figs. 1 and 2) includes a stationary lower section or pedestal P and an upper section or turret T which is revoluble about a vertical axis. Carried by the turret and preferably encased as indicated, is a registering means of any suitable type adapted to display through the window 20 the quantity and/or cost of the liquid dispensed. The pumping, measuring, and related elements of the apparatus are enclosed within the pedestal P, leaving exposed only the flexible hose 21, its nozzle 22, a support 23 for the nozzle (shown in Fig. 3), a switch-actuating crank 24, a register-resetting crank 25 and a visible discharge indicator 26. When the nozzle is removed from its support and carried to the tank to be serviced, the turret may be rotated by a pull on the hose to carry the dial face of the registering means (seen through the window 20) into position where it may be easily read by the operator while standing in a position adjacent the tank. Means, later to be described, are provided to return the turret to its rest position shown in Figs. 1 and 2, and means also are provided, as will later appear, for yieldingly holding the turret in various positions to which it may be moved by pulling on the hose so that the operator need not maintain a pull on the hose at all times during a servicing operation.

Referring to Fig. 3, the pedestal P includes a base 27 and a plurality of angle-iron columns 28 upstanding from the base and a cap 29 supported by said columns. The space between the base and cap is preferably enclosed, as for example, by four panels 30 (Fig. 3). These panels may be held in place by the usual or any suitable means, not shown herein.

Within the hollow pedestal P (Fig. 3) and directly supported on base 27, is an electric motor 31 which drives by the belt 32 and pulleys 33, the shaft 34 of a suitable pump. This pump, together with an air separator and the usual related parts, are all contained within a casing 35 which is supported from base 27 by a pair of legs 36, arranged one on each side of the motor. The suction pipe of the pump, shown in part at 37, is adapted for connection to an underground liquid supply tank in the usual manner. The outlet pipe for discharging the air-free liquid to be measured and dispensed is shown in part at 38 in Fig. 4. It discharges into a chamber 39 which is formed in part in the cap of casing 35 and in part in the base of a hollow standard 40 fixed to said cap.

The turret is rotatably supported from this standard 40. This turret includes a base frame 41 to which is suitably secured the meter 42 of the apparatus. Fixed to the meter 42 is a depending tubular shaft 43 which is rotatably supported in upper and lower sleeve bearings 44 and 45 and which has an open lower end communicating with chamber 39. This shaft has a shoulder near its upper end engaging the upper end face of bearing 44 and a collar 46 on its lower end engaging the lower face of bearing 45, whereby the shaft is held against any substantial axial displacement in its standard 40. The meter has a depending hub 47 which is telescoped over and rotatably engages the upper cylindrical portion 48 of standard 40. The lower end of hub 47 is connected to an inverted cup-shaped member 49 housing an anti-friction thrust bearing 50, which takes the weight of the turret and supports it from the standard as indicated. Liquid from chamber 39 enters the meter 42 by way of the hollow shaft 43. A spring-pressed seal ring 51, housed in standard 40, engages the upper end face of bearing 45 to avoid, so far as possible, leakage from chamber 39 between the shaft 43 and said bearing. A pipe 52 connects the hollow standard 40 at a point above the bearing 45 to the separator for the purpose of draining back any liquid passing the seal ring.

The turret includes a circular base plate 53 (Fig. 3) which is supported from and above the base frame 41 by three pipe columns 54. Each column 54 is screwed into frame 41 and further held thereto by a lock nut 55. The plate 53 is perforated to receive the columns and is held to each column by and between a pair of nuts 56, threaded on such column. The plate 53 may therefore be raised and lowered relatively to frame 41 and also leveled by the adjustable fastening provided by nuts 56. Plate 53 supports, as by brackets 57, the registering mechanism 58, the dial 59 of which is visible through window 20, as above described. This mechanism is driven from meter 42 by the shaft 60 and universal joint 61. The mechanism includes a variator or change gear means which is housed within the lower and cylindrical portion 58' of the registering mechanism. The outlet conduit of the meter consists of a pair of rigid pipe sections 62 and 63, the latter being connected to the visible discharge indicator 26,—and a flexible hose 21, connected at its inlet to section 63. The cap 29 on the pedestal P has a large central opening embordered by an upturned marginal flange 64. This opening is large enough in diameter to allow the meter 42 and its outlet pipe 62 to revolve freely. The base plate 53 of the turret has a downturned marginal flange 65 which conceals the flange 64 and the opening which it encompasses.

The apparatus carried by and located above the base plate 53 of the turret is housed in, except for the elements 21 to 26, inclusive, by a suitable casing. This casing includes certain parts which are normally fixed to the base plate 53 of the turret, such as the two side panels 66, and other parts such as the rear panel 67 and the front panel 68 with its sub-section 69, and the hood 70 which are removable. The hood is shown separately in Figs 12, 13 and 14. By removal of this one hood element, the casing is opened up as shown in Figs. 15 and 16 so that easy access may be had to all the parts enclosed therein. The panels 67 and 68 may also be removed without removing the hood.

Referring now to the details of the turret casing, the side panels 66 as shown in Figs. 9 and 16 are mounted in spaced, parallel, and upstanding relation on plate 53 and at diametrically opposite points. Each panel 66 is secured near its lower edge to an angle iron 71 which rests on but is not secured to plate 53. An inner angle iron 72 is fixed to both panel 66 and base 53. The upper end of each panel 66 is secured by a bracket 73 to the top of the casing of the register 58. Each panel 66 is embordered by a small out-turned marginal flange 74, having notches 75 therein (Figs. 15 and 16). The hood 70 (Fig. 12) has openings 76 corresponding in shape to the panels but slightly smaller so that the hood and panels overlap as shown in Fig. 9. The hood has a part 77 embordering the opening 76 and provided with a groove 78 to receive the out-turned flange 74. In lowering the hood into place, the inner vertical walls of groove 78 pass one through each notch 75, so that the vertical portions of flange 74 may enter one into each groove 78. The upper and curved portion of the part 77 is sprung over the corresponding part of flange 74 near the end of the operation of lowering the hood.

The rear panel 67 is simply a rectangular sheet large enough to cover the opening 79 (Fig. 14) and to overlap the marginal walls of the same as shown in Fig. 9. The upper edge of panel 67 is offset inwardly (Figs. 3 and 9) so as to lie inside the hood. The sides of this panel lie outside the hood and may be secured thereto as by two screws 80 (Fig. 9) passing through panel 67 and threaded one in each of the holes 81, shown in Fig. 14. The panel 67 is secured to the back of an angle iron 82, the base of which rests on top of plate 53 but is not fixed thereto. The hood has below the window opening 20 a rectangular opening 83 (Fig. 13) which is adapted to be closed by the rectangular panel 68, shown separately in Fig. 18. The side and top edges of panel 68 (Fig. 2) overlap the marginal walls of the opening 83 and are secured to such marginal walls by four screws 84. Panel 68 (Fig. 18) has an opening 85 to fit over the glass of the visible discharge indicator and below this opening is a U-shaped slot 86 to fit over the outlet connection to hose 21. The section 69 is a flanged collar adapted to slip over the hose 21. It is held to panel 68 by three screws 87 passing through the flange of the collar and threaded into panel 68. By removing the screws 87, the collar 69 is freed from panel 68 and may then be slid along hose 21 out of the way. Then the screws 84 are removed, whereupon panel 68 may be tilted forwardly (to the right in Fig. 15) to clear the glass of indicator 26 and then lifted. By so doing, openings are uncovered, one to the right and one to the left of the outlet pipe 63. Access to the variator mechanism may be had through these openings to two of the adjustments used for changing the setting of the variator. The rear panel 67 may be removed by loosening the two screws 80 which hold it to hood 70 and by then swinging the lower end of the panel outwardly (to the left as viewed in Fig. 15). The removal of panel 67 also allows access to a third adjustment for changing the setting of the variator.

The fixed side panels 66 serve one to support the resetting shaft 88 of the register 58, and the other to support by means of an attached bracket 89, an interlock mechanism shown in Figs. 10 and 11 which will later be described in detail.

The hood 70 has attached thereto a casing 90 forming a "boot" or housing for the spout of hose nozzle 22. Secured to the hood at the bottom of said housing is the nozzle support 23.

The motor 31 is controlled by a switch mounted within the box 91 (Fig. 3) and suitably connected in circuit therewith by wires contained within the conduits 92 and 93. This switch has an operating rod 94, capable of being raised and lowered between two extreme positions. These positions are shown one in Fig. 3 and the other in Fig. 8, and are respectively the "on" and "off" positions of the switch. The rod 94 is not rotatable and it remains in either of its extreme positions until moved out of such position by the means to be described. On the upper end of rod 94 is fixed a fork 95, between the branches of which an arm 96, fixed on the lower end of a rod 97, may engage. Rod 97 extends upwardly through the base 53 of the turret and at its upper end is pivotally connected to the outer end of an arm 98 which is fixed at a point intermediate its ends to one end of a shaft 99. The latter is rotatably supported in a bracket 100 fixed to a standard 101 which in turn is secured to the base 53 of turret T. A second short shaft 102 is mounted in bracket 100 and is connected at one end by bevel gears 103 with shaft 99 (see also Fig. 9). On the other and outer end of shaft 102 is fixed the above described lever 24. This lever, when turned counterclockwise as viewed in Fig. 17, will move rod 97 downwardly and cause the switch rod 94 to be moved to the "on" position shown in Fig. 8. The lever 24 may be moved in this way, when and only when the nozzle 22 is removed from its support 23. When the nozzle 22 is on its support, it projects into the path of lever 24 and blocks movement in the described direction.

It will be noted that the cap 29 has a recess 104 (Figs. 7 and 9) which enables the fork 95 to move up and down. The fork-engaging arm 96, however, rotates with turret T and moves out from between the branches of the fork whenever the turret is turned away from the illustrated position, which as will later appear is its initial or rest position. Thus, it will be clear that the switch can be closed or opened only when the turret is in its initial position. Also, the switch lever 24 cannot be moved to any substantial extent when the turret is in any other position because arm 96 will be blocked from movement by the flange 64 of cap 29. If the arm 96 is in its upper position as in Fig. 3, it lies above flange 64 and cannot be lowered much without engaging the flange. If the arm is in its lower position, as in Fig. 8, it lies below flange 64 and cannot be raised much without striking this flange.

The motor switch is interlocked with the register-resetting means so that the motor cannot be started until the register has been reset and so that resetting cannot be effected while the motor is operating. To effect these results the mechanism shown in Figs. 10 and 11 is used. This mechanism interlocks the register-resetting shaft 88 with a short shaft 105 which is suitably connected to the switch-actuating mechanism. As shown in Figs. 3 and 9, an arm 106 is fixed to the outer end of shaft 105 and connected by a link 107 to the inner end of the lever 98, above described. When the switch is moved to "on" position, shaft 105 will be turned in a clockwise direction as viewed in Figs. 3, 10 and 11. The shaft 105 is rotatably mounted in bracket 89 and has fixed thereto a member 108 having a shoulder 109 thereon. A dog 110, pivoted intermediate its ends at 111 to the bracket 89 has one end adapted to engage the shoulder 109 and prevent movement of shaft 105 in the clockwise direction necessary to turn on the motor switch. Lugs 112 on member 108, cooperating with a fixed stop 113 on bracket 89, limit the movement of the member and of all parts connected therewith such as the switch actuating lever 25; which therefore cannot be turned in a clockwise direction as viewed in Fig. 17.

In Fig. 11, the dog 110 is shown in position to prevent operation of the resetting mechanism by crank 25. A tooth 114 on the dog engages in a notch 115 in a member 116 which is rotatably supported on bracket 89. Member 116 is connected, as indicated in Fig. 9, to the reset shaft 88. Thus, the register cannot be actuated by the resetting means while the motor switch is unlocked preliminary to movement to "on" position or while in the last-named position. Once the turret has been turned out of said position, the switch cannot be moved to "off" position and since it must be thus moved in order to unlock the member 116, resetting of the register is prevented when turret T is in any position other than its initial position.

The dog 110 is moved from one to the other of its two extreme positions by toggle mechanism. A toggle link 117 is pivotally mounted on stud 111 to swing independently of dog 110 and at its other end is pivoted to one end of a second toggle link 118. The lower end of link 118 slides in a lug 119 on bracket 89 and a spring 120 acts between this lug and a shoulder on the link. The toggle link 117 has pins 121 thereon which project outwardly in underlying relation with dog 110. When the toggle links are moved from one to the other of the two extreme positions illustrated, one or the other of these pins 121 will engage and move the dog 110. The toggle links are moved either by a cam 122 on member 105 or by a cam 123 on member 116. Each of these cams will engage the adjacent pin 121 and move it and the toggle links far enough to cross the line of centers connecting the pivot points of these links, whereupon the spring 120 which has been stressed by this movement of the toggle links, will expand and move the links into the other extreme position, actuating the dog 110 with a snap action.

The particular type of register used herein is so constructed that the resetting shaft 88 must be turned 405 degrees in a counterclockwise direction, as viewed in Figs. 10 and 11. When thus turned and released, the shaft will move back 45 degrees in a clockwise direction and come to rest. The net result is one complete revolution of member 116. However, the tooth 114 would, unless otherwise restrained, move into notch 115 at the end of 360 degrees' movement in a counterclockwise direction, and prevent the desired further movement of 45 degrees. To avoid such action, the following means are employed. A disk 124 (Fig. 9) is mounted on 125, which carries member 116, and a star-shaped spring 126 on said shaft presses this disk against a friction washer 127 and the latter against member 116. Disk 124 carries an ear 128 (Fig. 10) which can move in under the arc-shaped surface 129 on dog 110. Such surface is coaxial with member 116 and ear 128, when the dog is in the Fig. 10 position. The ear 128 is driven from member 116 only through frictional engagement. It will travel with member 116, when the latter is turned in a counterclockwise direction, until it engages the tooth 114. The ear 128 will then have moved 45 degrees and come in under the surface 129 in position to support dog 110 when required. On continued movement of member 116 in the counterclockwise direction, ear 128 remains stationary. During this movement, cam 123 will engage the right-hand pin 121 on toggle link 117 and move the links to the left across their line of centers, after which spring 120 will move the links still further to the left and nearly into the position shown in Fig. 11 in readiness to move dog 110 when the latter is released from ear 128. The notch 115 is carried 45 degrees in a counterclockwise direction beyond tooth 114. Then, on the return 45 degree movement, the member 116 and ear 128 will move together and, at the moment when notch 115 moves into line with tooth 114, the ear 128 will have moved out from the end of dog 110. The latter, being thus released, will be moved by the toggle spring 120 into the position shown in Fig. 11, thus unlocking the switch lever for movement and locking the resetting mechanism against movement. Lever 24 is then moved, which turns member 105 in a clockwise direction until the right-hand lug 112 abuts stop 113. In the course of this movement, cam 122 will move the toggle links across their line of centers and spring 120 will move them the rest of the way into position to swing dog 110 in a counterclockwise direction. However, the notch 109 will have been moved beyond the left-hand end of dog 110 and such end will ride on surface 130 of member 105 and thus be held against clockwise movement. When, however, the switch is turned off, member 105 will be turned counterclockwise and, as soon as notch 109 comes into line with the left-hand end of dog 110, the latter moves into the notch to lock the switch and unlock the resetting mechanism.

The turret T which may be turned in either direction from its initial position by pulling on the hose 21, is automatically returned to its initial position by the following means (see Figs. 3 and 6). A cable 132, one end of which is fixed, as indicated in Fig. 6, to a drum 133 and is wound on the latter, has its other end connected to a stud 134 fixed to an arm 135, formed on the upper portion of the above described member 49 which constitutes a drum fixed to the turret T. The first or winding drum 133 is rotatably supported on a stud 136 which is fixed to and upstands from an arm 137, formed on the stationary housing 40, above described. The drum is recessed at opposite ends to house spiral springs 138 which tend to wind up the cable 132. Disks 139, one adjacent each recessed end of drum 133, have attached hubs 140 which are pinned to stud 136, as clearly shown in Fig. 5. Each disk 139 has a stud 141 fixed thereto and extending into the adjacent recess in drum 133 and receiving one end of the spring in such recess. The other end of each spring 138 is secured to the hub of drum 133. As will be clear from Fig. 6, the springs 138 tend to wind up the cable 132 and to turn the drum 49 and the connected turret T into the illustrated and rest position. The drum 49 comes to rest when the line of centers connecting the axis of drum 49 and that of stud 134 extends tangential to drum 133. Whichever direction the turret is turned away from rest position, it will be turned back to such position by the winding up of cable 132 on drum 133 by springs 138. The amount of cable wound on drum 132 may be varied as desired. It is preferably at least enough, as shown, to allow the turret T to be turned one complete revolution and may be more if desired.

When the operator pulls on the hose to rotate the turret to a desired position, it is desirable that he be relieved of the work of holding the turret in such position. To this end, the means shown in Fig. 6 are provided. A disk 142 having a plurality (eight in this case) of angularly-spaced notches 143 in its peripheray, is secured to the drum 49 of the turret support (see also Fig. 4). Pivotally mounted on a stud 144, fixed to a bracket 145, secured by cap screws 146 to the fixed casing 40, is a lever 147. One end of lever 147 carries a roll 148 adapted to engage in any of the notches 143. The other end of the lever is connected by a spring 149 to any suitable stationary part, such for example as one of the columns 28. The notches 143 in disk 142 are part-cylindrical and of the same radius as roll 148. Each notch is shallow and receives less than half of the roll. For example, each notch may be about 110 degrees in angular extent. The purpose is to enable the roll 148 to engage a notch and hold the turret in any one of a plurality of angular positions and yet allow the turret to be rotated by the winding drum 133 and cable 132 back to initial or rest position. If, when the turret is turned until the roll 148 enters one of the notches 143, the pull on the hose is gradually relaxed, the roll will remain in the notch and hold the turret in the position to which it has been moved. But the hold on the turret is not enough to prevent the turret from being turned all the way back to its initial position if the pull on the hose is suddenly relaxed at a time when the roll 148 is not engaged in any notch. The disk 142 will revolve and the roll 148 will move in and out of the notches 143 successively until the turret reaches its initial or rest position.

The operation of the apparatus will next be described. The operator removes the nozzle 22 from support 23 and then turns crank 24 to close the switch of motor 31. Crank 24 may be thus operated only if register 58 has been reset to zero and the lock shown in Fig. 10 has been released. Otherwise, it will first be necessary to turn reset crank 25 one and one-eighth revolutions in a counterclockwise direction as viewed in Fig. 1, release the crank and allow it to turn clockwise one eighth of a revolution. This, as above described in detail, will move dog 110 into the position shown in Fig. 11 to release the switch actuating means and lock the register resetting means against operation. The motor being started, the operator carries the nozzle 22 to the tank to be serviced. By pulling on the hose he is able to turn the turret into a position where he can conveniently read the register from his station at the tank. When he has thus turned the turret to approximately the desired position, he then slowly moves the turret, either by a further pull on the hose or by relaxing his pull, until the detent roll 148 moves into one of the notches 143. Then the operator may entirely relax his pull on the hose and the turret will be held without effort on his part during the servicing operation. As soon as such operation is completed, the operator pulls on the hose to carry the roll 148 out of the notch 143 in which it has been engaged and then suddenly releases his pull, whereupon the winding drum 133 will return the turret to initial position, the detent roll riding successively into and out of the notches 143 without being able to stop the rotation of the turret. The switch lever 24 is then turned to "off" position and nozzle 22 is hung up on support 23. Such movement of the switch lever moves dog 110 to the Fig. 10 position, thereby locking the switch and releasing the register resetting means. Resetting of the register must be effected before the pump motor can again be started.

It is to be noted that the turret is free to turn at any time. It could be turned before the operator removes the nozzle from support 23. It could be turned after the nozzle has been removed from its support and before switch lever 24 has been turned to "on" position. Such turning of the turret would be fruitless, however, because the motor switch can only be operated when the turret is in its rest position. The winding drum 133 normally holds the turret in such position and it is intended that the operator shall follow the natural and convenient plan of starting the pump motor before carrying the nozzle to the tank to be serviced. The means, herein provided, compel him to follow this plan.

It is also necessary for the operator to return the turret to its initial or rest position. The use of turret-holding means, such as 148—143, makes it possible for the operator to leave the turret in some other position. If he does so, he will not be able to hang up the hose nozzle 22 on its support 23 because the lever 24 is in the way and cannot be turned out of the way unless and until the turret has been moved back to initial position. The arm 96 will engage the under side of cap 29 and prevent full movement of the switch lever 24 to "off" position. It is necessary to swing this arm into line with recess 104 by turning the turret back to initial position before the switch lever can be thus moved.

It is important for the sake of appearance that the turret be maintained in its initial position. The use of spring means to insure restoration of the turret to such position imposes an undesired burden on the operator of supplying the force to hold the turret in various positions to which it may be moved. Hence, the turret retaining means has been employed to relieve the operator of the burden of holding the turret against the force of the springs in winding drum 133. Then, to overcome the disadvantage that the turret may be left in some other than its rest position, the arrangement has been provided whereby the operator cannot stop the motor until the turret has been turned back to initial position.

The apparatus may be used in various ways. The one pump having the one register may be mounted on an "island" at a service station and made to serve cars on both sides of the island. The apparatus, as shown, will serve a car on one side of the island. Then the turret can be turned 180 degrees from the position shown to present the window 20 on the opposite side of the island. The arrangement also enables the operator to swing the turret to bring window 20 into position so that he can conveniently read the register while stationed at the tank and so that at the end of the servicing operation, he can swing the turret to some other position from which the customer can read the register. The turret may be turned to any desired radial position throughout a range of 360 degrees for the convenience of the operator or the customer. Also, the turret may be held, at the will of the operator, in any of a predetermined number of radial positions, without requiring him to maintain a pull on the hose.

The invention thus provides an improved dispensing and measuring apparatus which enables the register to be conveniently read from any desired radial position. It affords features resulting in greater convenience in operation, with adequate safeguards against operation in other than the planned manner.

What I claim is:

1. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard and to which said register is fixed, said conduit being carried in part by the standard and in part by the turret and having interposed therein a swivel joint enabling the turret to turn, said hose being connected to the turret so that the latter may be rotated by pulling on the hose, and releasable means for holding the turret in any one of a plurality of predetermined positions to which it may be moved by pulling on said hose.

2. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard and to which said register is fixed, said conduit being carried in part by the standard and in part by the turret and having interposed therein a swivel joint enabling the turret to turn, said hose being connected to the turret so that the latter may be rotated by pulling on the hose, said turret having a part provided with a plurality of angularly-spaced recesses, and a detent mounted on the standard and adapted to engage in any one of said recesses as the turret is rotated by pulling on the hose, whereby to yieldingly hold the turret in any of a plurality of predetermined positions to which it may be moved.

3. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard and to which the said register is fixed, said conduit being carried in part by the standard and in part by the turret and having interposed therein a swivel joint enabling the turret to turn, said hose being connected to the turret so that the latter may be rotated by pulling on the hose, yieldable means tending to hold said turret in a predetermined initial position and to automatically return the turret to such position when the pull on the hose is relaxed, said turret having a part provided with a plurality of angularly-spaced recesses, and a detent mounted on said standard and adapted to engage any one of said recesses for yieldably retaining the turret in any one of a plurality of predetermined positions to which it may be moved by pulling on said hose, said detent being effective to retain the turret in any such position only when the detent is eased into a recess and being yieldable to the force of said turret-returning means if the pull on the hose is suddenly relaxed.

4. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard and to which said register is fixed, said conduit being carried in part by the standard and in part by the turret and having interposed therein a swivel joint enabling the turret to turn, said hose being connected to the turret so that the latter may be rotated by pulling on the hose, yieldable means tending to hold the turret in a predetermined initial position and to automatically return the turret to such position when the pull on the base is relaxed, said turret having a part provided with a plurality of angularly-spaced part-cylindrical notches in its periphery, a detent pivotally supported from said standard and having a roll and means yieldably pressing the roll against said periphery, whereby the roll may ride into any one of said notches when the turret is turned by pulling on the hose, the engagement of the roll in a notch operable to hold the turret stationary when the roll is eased into the notch but not when the pull on the hose is suddenly relaxed, in which case the momentum of the turret carries the notches in said part rapidly past the detent roll and back into initial position.

5. The combination in a liquid measuring and dispensing apparatus, of a standard, a turret supported by the standard for rotation about a vertical axis, a register and a meter for driving the register both carried by the turret, liquid supply means carried by the standard, connections between said means and meter including an interposed swivel enabling rotation of the meter with the turret, a discharge conduit from the meter terminating with a flexible hose suspended from the turret and by means of which the turret may be turned to various radial positions to present the register for convenient reading, and releasable means for holding said turret in any one of a plurality of predetermined radial positions to which it may be moved by pulling on said hose.

6. The combination in a liquid measuring and dispensing apparatus, of a standard; a turret including a base frame mounted on the standard for rotation about a vertical axis, a base plate, and a plurality of columns fixed to both frame and plate and supporting the latter above and in parallel relation with the former; a meter mounted on the base frame, a register mounted on top of the base plate and driven by the meter, liquid supply means carried by the standard, conduit connections between said means and meter including a swivel joint in coaxial relation with the axis of rotation of the meter, and a discharge conduit including a rigid member fixed to the meter and a flexible hose which is fixed to said member and by means of which the turret may be turned about said axis.

7. The combination in a liquid measuring and dispensing apparatus, of a standard; a turret including a base frame mounted on the standard for rotation about a vertical axis, a base plate, a plurality of columns upstanding from the base frame and supporting the base plate, and means for adjusting the space between the base plate and base frame and for leveling the base plate; a meter mounted on the base frame, a register mounted on top of the base plate and driven by the meter, liquid supply means carried by the standard, conduit connections between said means and meter including a swivel joint in coaxial relation with the axis of rotation of the meter, and a discharge conduit including a rigid member fixed to the meter and a flexible hose which is fixed to said member and by means of which the turret may be turned about said axis.

8. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard and to which said register is fixed, said turret including a coaxially-located drum, said conduit being carried in part by the standard and in part by the turret and having interposed therein a swivel joint enabling the turret to turn, said hose being connected to the turret so that the latter may be rotated by pulling on the hose, an arm fixed to and projecting outwardly from the standard, a spindle carried by the arm and having its axis parallel to that of the turret, a spring-actuated winding drum mounted on said spindle, and a cable fixed at one end to the winding drum and at the other end to the first-named drum and normally wound up on the first-named drum and holding the turret in a predetermined initial position.

9. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard and to which said register is fixed, said turret including a coaxially located drum, said conduit being carried in part by the standard and in part by the turret and having interposed therein a swivel joint enabling the turret to turn, said hose being connected to the turret so that the latter may be rotated by pulling on the hose, a spindle stationarily supported with its axis in spaced parallel relation to that of the turret, a winding drum rotatable on said spindle and having recesses in its upper and in its lower end face, a cable interconnecting the drums, spiral springs located one in each of said recesses and fixed at one end to the drum, upper and lower members fixed to said spindle one above and one below the winding drum, and anchor members one on each member extending into the adjacent recess and connected to the other end of the spiral spring in such recess.

10. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, and a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate supporting the register, and casing sections mounted on the base plate to enclose said register, the latter having a resetting shaft and an actuating crank therefor, one of said sections being fixed to and upstanding from the base plate, such section supporting one end of said shaft with said crank located on the exterior thereof, another section being conveniently removable to give access to the top of the base plate and the register thereon.

11. In liquid dispensing apparatus of the type having a dispensing conduit including a flexible hose and a visible discharge indicator adjacent the entrance to the hose, a meter interposed in said conduit for measuring the liquid dispensed, a register driven by the meter for indicating the amount of liquid dispensed, and means for creating a flow of liquid through said conduit, the combination of a standard, a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate supporting the register and casing sections mounted on the base plate to enclose said register, one of said sections including an easily removable hood covering the register and carrying a window through which the indications of the register are visible, another section being secured to said plate and having an opening through which a part of said indicator extends, and conveniently removable means for fastening said hood and last-named section together, whereby on removal of the last-named means said hood may be lifted free of the base plate to expose said base plate and the register carried thereby.

12. In liquid dispensing apparatus of the type having a dispensing conduit including a flexible hose, a meter interposed in said conduit for measuring the liquid dispensed, a register driven by the meter for indicating the amount of liquid dispensed, electrically-operated means for creating a flow of liquid through said conduit, a control switch for said means, and switch actuating means including a shaft and an actuating crank, the combination of a standard, and a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate supporting said register and casing sections mounted on the base plate to enclose said register, one of said sections including an easily removable hood covering the register and carrying on one side a window through which the indications of the register are visible and having on another side a recess extending upwardly from its base to receive said shaft, another casing section extending upwardly from the base plate to said shaft and covering said recess.

13. In a computing type liquid measuring and dispensing apparatus, having a dispensing conduit including a flexible hose, a meter interposed in the conduit, a register driven by the meter for showing the quantity and cost of the liquid dispensed and including a variator for adjusting the cost part of the register for variations in unit price, and means for creating a flow of liquid through said conduit, the combination of a standard, and a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate supporting the register and an easily removable hood mounted on the base plate, said hood having an independently removable section to allow access to said variator without removing the hood.

14. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, and a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate supporting said register, a pair of fixed side plates upstanding from the base plate, and an easily removable hood cooperating with said side plates and base plate to complete an enclosure for the register.

15. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of liquid through said conduit, the combination of a standard, and a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate carrying said register and a hood enclosing the register and supported on and easily removable from the base plate.

16. In liquid dispensing apparatus of the type having a dispensing conduit including a flexible hose, a meter interposed in said conduit for measuring the liquid dispensed, a register driven by the meter for indicating the amount of liquid dispensed, and means for creating a flow of fluid through said conduit, the combination of a standard, a turret rotatably mounted on the standard, said conduit being carried in part by the standard and in part by the turret and having interposed therein a swivel joint enabling the turret to turn, said hose being connected to the turret so that the latter may be rotated by pulling on the hose, said turret including a base plate carrying said register and a hood enclosing the latter and supported on and easily removable from the base plate, and a support carried by said hood on which the outlet end of the hose may be hung when not in use.

ALFRED L. GRISÉ.

CERTIFICATE OF CORRECTION.

Patent No. 2,340,218. January 25, 1944.
ALFRED L. GRISÉ.

It is hereby certified that error appears in the printed specification of the above numbered patent requiring correction as follows: Page 3, first column, line 17, for "connrection" read --connection--; page 4, second column, line 55, for "peripheray" read --periphery--; page 6, first column, line 64, for the word "base" read --hose--; and that the said Letters Patent should be read with this correction therein that the same may conform to the record of the case in the Patent Office.

Signed and sealed this 28th day of March, A. D. 1944.

Leslie Frazer (Seal) Acting Commissionr of Patents.